S. DOWNEY.
Wheels for Vehicles.
No. 151,206. Patented May 26, 1874.
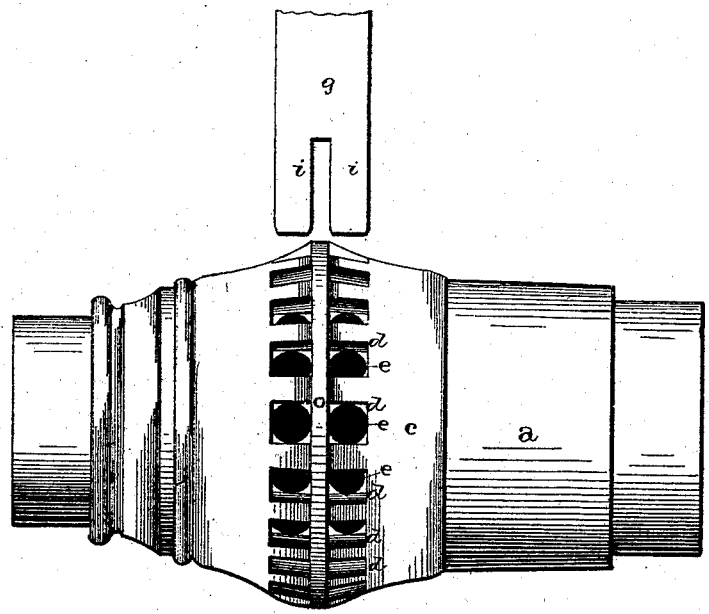
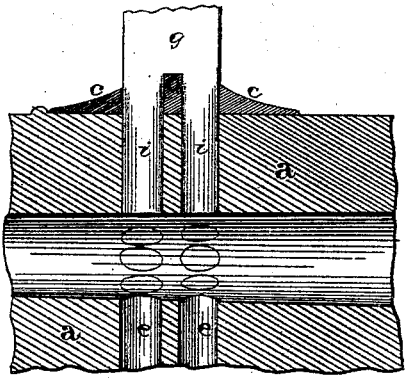
WITNESSES.
Phil. W. Hale
W. W. J. Murphy
INVENTOR.
Stephen Downey
per
F. A. Lehmann, Atty

UNITED STATES PATENT OFFICE.

STEPHEN DOWNEY, OF WILMINGTON, DELAWARE.

IMPROVEMENT IN WHEELS FOR VEHICLES.

Specification forming part of Letters Patent No. 151,206, dated May 26, 1874; application filed January 26, 1874.

*To all whom it may concern:*

Be it known that I, STEPHEN DOWNEY, of Wilmington, in the county of New Castle and State of Delaware, have invented certain new and useful Improvements in Hubs; and I do hereby declare the following to be a full, clear, and exact description of the invention, such as will enable others skilled in the art to which it pertains to make and use it, reference being had to the accompanying drawings which form part of this specification.

The nature of my invention relates to an improvement in hubs; and it consists in forming upon the end of each spoke two square tenons, which tenons are to be driven or forced into round holes made in the hub to receive them. It also consists in a metallic band, which is forced upon the hub, and which has two rows of openings through it, and a rim or band formed between the openings, which band comes in between the two tenons and prevents the spoke from being driven down into the hub, all of which will be more fully described hereafter.

Figure 1 represents a side elevation of a hub with a spoke ready for insertion. Fig. 2 is a part section view of the same with the spoke driven into position.

*a* represents an ordinary wooden hub, upon which is forced the metallic band *c*, through which are made two rows of square openings, *d*, which openings are made side by side so as to be on a line with each other. Between these two rows of openings is formed a rim or band, *o*, of any desired width or height. After the band has been forced upon hub, a round hole, *e*, is bored into the hub, through the square hole in the band *c*, as shown in Fig. 1. Each spoke *g* has two square tenons, *i*, formed upon its inner end, which tenons are driven into the round holes *e*, straddling over the top of the rim *o*, as shown in Fig. 2. By making the tenons square and forcing them into round holes the spokes are held much more firmly and securely in place than can be done by forcing them into square holes. The rim *o* coming up between the two tenons prevents the spokes from being driven into and injuring the hub.

Having thus described my invention, I claim—

The combination of the band *c*, having two rows of openings, *d*, and rim *o*, with the hub *a* and spokes *g*, provided with tenons *i*, substantially as shown and described.

In testimony that I claim the foregoing I have hereunto set my hand this 20th day of January, 1874.

STEPHEN DOWNEY.

Witnesses:
F. A. LEHMANN,
W. W. J. MURPHY.